(12) United States Patent
Skogerbø

(10) Patent No.: US 8,397,837 B2
(45) Date of Patent: Mar. 19, 2013

(54) ANTI-COLLISION SYSTEM

(75) Inventor: Pål Skogerbø, Kristlansand (NO)

(73) Assignee: Aker Kvaerner MH AS, Kristiansand (NO)

( * ) Notice: Subject to any disclaimer, the term of this patent is extended or adjusted under 35 U.S.C. 154(b) by 1525 days.

(21) Appl. No.: 10/565,436

(22) PCT Filed: Aug. 12, 2004

(86) PCT No.: PCT/NO2004/000242
§ 371 (c)(1),
(2), (4) Date: Jan. 20, 2006

(87) PCT Pub. No.: WO2005/017306
PCT Pub. Date: Feb. 24, 2005

(65) Prior Publication Data
US 2006/0151215 A1    Jul. 13, 2006

(30) Foreign Application Priority Data
Aug. 15, 2003    (NO) .................................. 20033654

(51) Int. Cl.
*E21B 19/00*    (2006.01)
(52) U.S. Cl. ...................... 175/52; 166/341; 166/250.01; 414/22.51
(58) Field of Classification Search .................. 166/341, 166/360, 250.01; 175/24, 85, 52; 414/22.51–22.57; 212/286, 280; 340/436, 686.6
See application file for complete search history.

(56) References Cited

U.S. PATENT DOCUMENTS

| | | | | |
|---|---|---|---|---|
| 3,874,518 A | * | 4/1975 | Swoboda et al. | 414/733 |
| 3,877,583 A | * | 4/1975 | Bokenkamp | 414/22.54 |
| 4,042,123 A | * | 8/1977 | Sheldon et al. | 414/22.71 |
| 4,578,757 A | | 3/1986 | Stark | |
| 4,613,849 A | | 9/1986 | Smith, Jr. et al. | |
| 4,621,974 A | * | 11/1986 | Krueger | 414/800 |
| 4,718,805 A | * | 1/1988 | Becker | 414/22.54 |
| 4,888,707 A | * | 12/1989 | Shimada | 700/255 |
| 4,922,430 A | * | 5/1990 | Wavish | 700/255 |
| 5,056,031 A | * | 10/1991 | Nakano et al. | 701/301 |
| 5,265,683 A | * | 11/1993 | Krasnov | 175/52 |

(Continued)

FOREIGN PATENT DOCUMENTS
| | | |
|---|---|---|
| DE | 293 302 | 8/1991 |
| EP | 0 957 452 | 11/1999 |

(Continued)

OTHER PUBLICATIONS
International Search Report for PCT/NO2004/000242 dated Dec. 8, 2004.

(Continued)

*Primary Examiner* — Matthew Buck
(74) *Attorney, Agent, or Firm* — Nixon & Vanderhye P.C.

(57) ABSTRACT

This invention relates to a system for controlling the movements of objects in an automated or remote operated system, as well as a related method and use of the system comprising independent transporting means for moving a number of objects relative to each other, the system being providing with means for controlling the position and velocity of the objects relative to each other. Each object is related to a defined geometric shape related to the object positions having dimensions corresponding to or exceeding the physical dimensions of the object in all directions, and also defining a critical allowed distance between the defined geometric shapes.

12 Claims, 3 Drawing Sheets

U.S. PATENT DOCUMENTS

Figure 1:
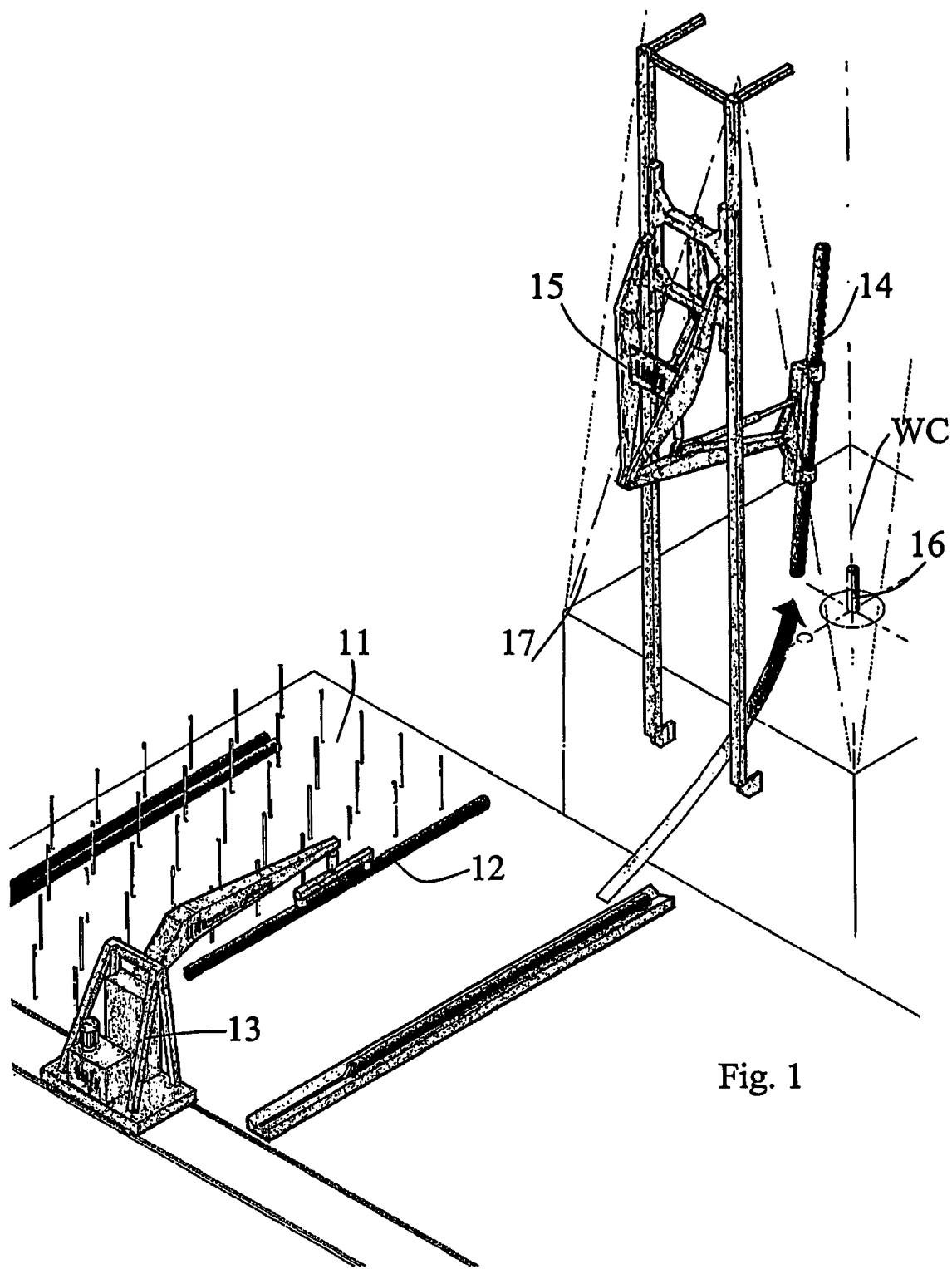

| | | | | |
|---|---|---|---|---|
| 5,458,454 | A | * | 10/1995 | Sorokan .................. 414/800 |
| 5,627,508 | A | * | 5/1997 | Cooper et al. ............. 340/425.5 |
| 5,726,366 | A | * | 3/1998 | Washio et al. .............. 73/865.8 |
| 6,049,746 | A | * | 4/2000 | Southward et al. ............. 701/37 |
| 6,179,065 | B1 | | 1/2001 | Payne et al. |
| 6,246,932 | B1 | * | 6/2001 | Kageyama et al. ............. 701/24 |
| 6,283,702 | B1 | * | 9/2001 | Devlugt et al. ............ 414/745.7 |
| 6,452,604 | B1 | | 9/2002 | Sato |
| 7,034,669 | B2 | * | 4/2006 | Lamb .......................... 340/436 |
| 7,289,871 | B2 | * | 10/2007 | Williams ...................... 700/160 |
| 2002/0166698 | A1 | * | 11/2002 | Beato et al. ..................... 175/7 |

FOREIGN PATENT DOCUMENTS

| | | |
|---|---|---|
| GB | 1 437 588 | 5/1976 |
| GB | 2 205 463 | 12/1988 |
| WO | 00/65193 | 11/2000 |

OTHER PUBLICATIONS

Norwegian Search Report for 20033654 dated Feb. 24, 2004.
PCT International Preliminary Report on Patent dated Feb. 21, 2006, issued in PCT Patent Application No. PCT/NO2004/000242.

* cited by examiner

Machine 1

Machine 2

Machine 1

Machine 2

ANTI-COLLISION SYSTEM

This application is the U.S. national phase of international application PCT/NO2004/000242 filed 12 Aug. 2004, which designated the U.S. and claims benefit of U.S. Pat. No. 2,0033,654, filed 15 Aug. 2003, the entire contents of each of which are hereby incorporated by reference.

The present invention relates to a system for controlling the movements of objects in an automated system comprising independent transporting means for moving a number of objects relative to each other, and a method for avoiding collisions between the objects, and the use of such a system.

In automated or remote controlled systems comprising a number of objects moving partially independent of each other there is always a danger of collisions between the objects. One example of a system as described above is systems including automatic or remote operated machines involved in the operation on a drilling rig. A drilling rig comprises of several different machines. The machines are often specially developed to fit the layout on the rig and the strategy for operation, and may be moved in the system according to their purpose.

The target operation for a drilling rig is to drill wells on the seabed. This is, very simplified, done by rotating a drillstring, with a drilling-bit in the lower end, and lowering it into the seabed. The drillstring consists of several threaded pipes that are connected together. The pipes are made up/broke out in order to prolong or shorten the drillstring. Consequently the main operations on a drilling rig is to drill, move pipes between horizontal and vertical pipestores and well centre, where the drillstring is rotated, and make up/break out pipes when connecting/disconnecting pipes to or from the drillstring. This represents a complex system as the different parts may have different weight, size, direction and velocity, and may in addition be rotated as part of the operation. Many of the objects may have complex geometries, making it even harder to predict the exact room they occupy in the system at all times. During complex operations there is a danger that the operator loose the overview of the situation, increasing the chances of collision. A collision may occur if the operator makes simple mistakes such as a misinterpretation of position data, the orientation of an object or if the object has shifted slightly relative to its registered location.

A solution to this would be to slow the operation down so as to maintain the overview of the system, or to use large safety margins which also reduces the speed and efficiency of the system, especially when operations are performed in areas with limited space, such as drill rigs at sea.

Thus it is an object of this invention to provide a system that allows several objects to move within a system without risking collisions or accidents, providing an increased efficiency to the system when compared to the previously known systems. This object is obtained by a system as described in the accompanying independent claims.

The system according to the invention thus provides a simple and effective system which does not demand large calculation powers in operating a system, as it keeps track of geometrical objects being related to controllable position data for each object in the system, e.g. having simplified shapes which may give an extra tolerance in the stored position data and which are easy to visualise on a computer screen. In addition, a tolerance is provided around the objects and routines are established for relating a set of rules for the relative movements of the objects.

The management system related to this invention will be referred to below as a Smart Zone Management System (SZMS)

The invention will be described below with reference to the accompanying drawings, illustrating the invention by way of example.

FIG. 1: illustrates a pipe handling system suitable for implementation of the invention.

Figure 2:
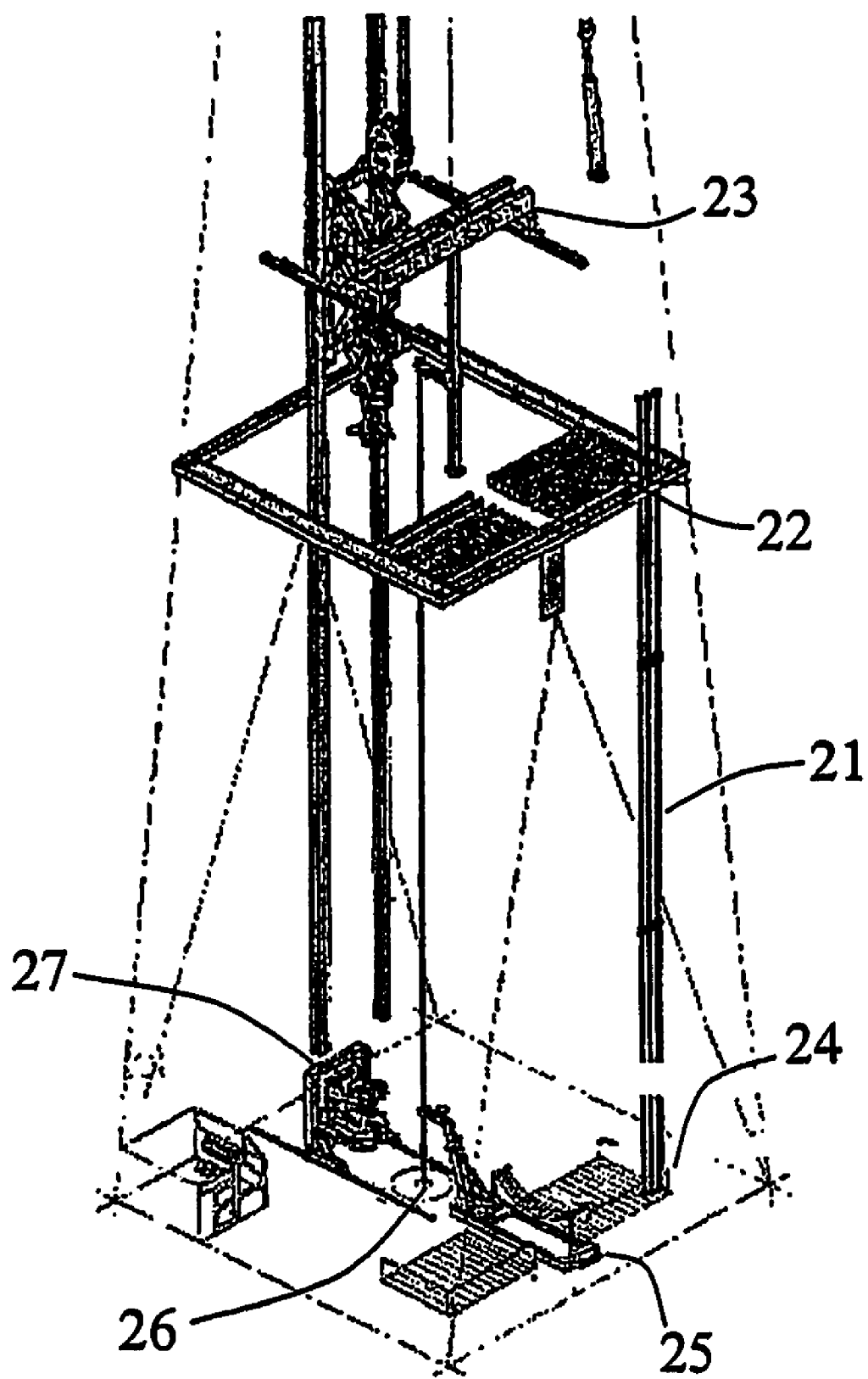

FIG. 2: illustrates another pipe handling system suitable for implementation of the invention.

Figure 3:
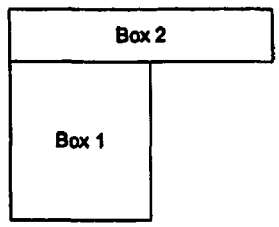
Figure 3:
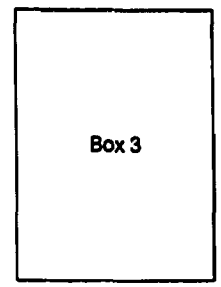
Figure 3:
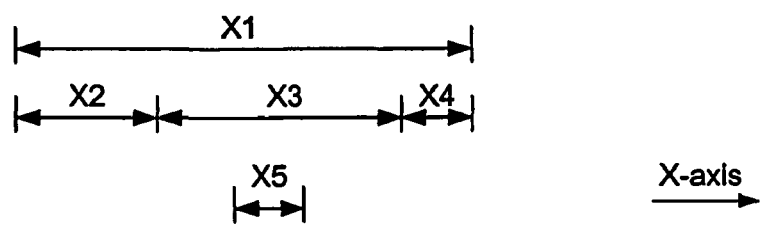

FIG. 3: Principle drawing of two machines represented by boxes. The machines are travelling towards each other.

Figure 4:
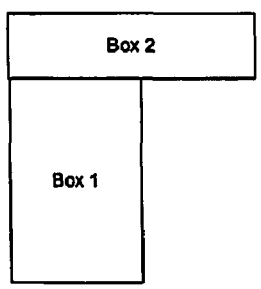
Figure 4:
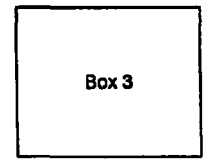
Figure 4:
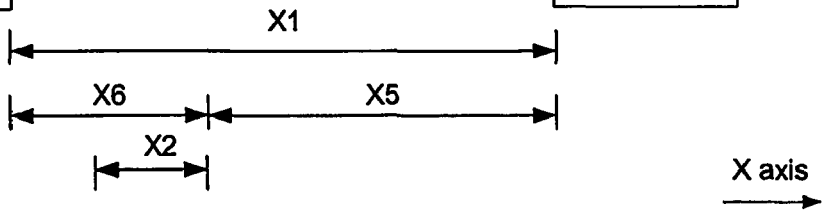

FIG. 4: Principle drawing of two machines represented by boxes. Machine 1 is moving towards machine 2. Machine 2 is moving away from machine 1.

FIG. 1 illustrates an example of a system on a drill rig, in which the system according to the invention may be used.

In horizontal to vertical pipehandling system the pipes (singles) 12 are usually stored horizontally and as singles on pipedeck 11. A common configuration of machines 13,15,18 used to transport pipe between pipedeck (horizontally) and the drilling rig (vertically) 17 are a piperack crane 13 in combination with a tubular feeding machine 18 and an Eagle Light/HTV-Arm 15.

As is clear from this example the pipe handling system comprises a number of element that may operate fairly independent of each other so that collisions may occur. Also, the different machines will take up different volumes of space e.g. when the crane picks up a pipe. Some of the parts of the system may also rotate such as the pipes 12,14 being moved from a horizontal to a vertical position, and thus occupying a different space after than before the operation.

FIG. 2 illustrates a vertical pipe handling system involving machines to move stands 21 (usually 2 or 3 made up single pipes) vertical in the derrick between the vertical store (setback and fingerboard) 22,24 and well center (WC) 26 is usually a part of a drilling rig. This is a common configuration known as a "Vertical Pipehandling Two-Arm Syncro system" (VPH). This VPH system comprises of one bridgecrane 23 mounted in the derrick and one lower guiding arm 25 mounted on drillfloor. The drawing also shows a roughneck for screwing the stands 21 to the pipes already positioned in the well centre 26. Thus this system moves the stands out of the vertical store onto the pipes in the well centre.

As stated above the main purpose of this invention is to avoid collisions between machines that are members of the system. Referring also to FIG. 3 this is obtained by relating each part of the system to an imaginary 3-dimensional object 1,2,3 having a defined geometric shape corresponding to or exceeding the physical dimensions of the part in all directions. The imaginary object 1,2,3 is also assigned to position data corresponding to the physical position of the related machine part, so that it may control the movements of the objects in a model of the real situation, wherein the model may incorporate all relevant information about fixed and moving objects in the rela world. Thus machine Ml in FIGS. 3 and 4 may thus represent a crane 1 holding a horizontal pipe 2 moving toward the drill rig 3, M2.

Each geometric shape or box 1,2,3 may consist of several rectangles providing the approximate shape of the object, and may also rotate, e.g. correspond to a pipe being lifted from a horizontal to a vertical position. Thus the boxes are dynamic and reflect the machines position and extent in the system. If boxes reflecting different machines are in conflict, (sharing room in the Cartesian coordinate system) a collision has occurred. All machines must relate to the same Cartesian coordinate system. The Cartesian coordinate system can be oriented with positive x-axis from well center toward V-door, positive y-axis from well center toward fingerboard and positive z-axis from drillfloor and upward.

In addition each machine M1, M2 is related to a stop distance (distance needed to come to a complete stop in a controlled manner) for each axis in the Cartesian co-ordinate system. The stop distances are the actual distance needed to stop the machine at the present speed and load in the given direction, and may depend of the weight or number of parts handled by each machine, as in the machine M1 comprising two parts 1,2. The stop distances are used in the system or method according to the invention to ramp down and stop the machines before collision occurs. A minimise function is implemented in the machine programmable logic controller (PLC) to make sure that the least of command value from operator (e.g. joystick) and allowed value (calculated in the system) is used for machine control.

FIG. 3 shows a principle drawing of two machines represented by boxes. Box 1 and box 2 represent machine 1, box 3 represent machine 2. X1 is the minimum distance between the two machines along the x-axis (at a given moment). X2 is the distance the system uses to ramp down and stop machine 1 (derived from stop distance calculated in the machine PLC). X4 is the distance the system uses to ramp down and stop machine 2. In FIG. 3 the two machines are travelling towards each other along the x-axis. If machine 1 or machine 2 is standing still or travelling in the opposite direction, X2 and X4 would be zero (respectively). X5 is the safety distance between the two machines along the x-axis. As the machines are travelling towards each other X3 will decrease. When X3=X5 SZMS starts to ramp down the machines. The machines will come to a complete stop with a distance of X5 between them (along the x-axis). The same calculations and evaluations will be done for y-axis and z-axis.

In FIG. 4 machine 2 is moving away from machine 1 (along the x-axis) and machine 1 is moving towards machine 2. X1 is the minimum distance between the two machines along the x-axis (at a given moment). X2 is the distance SZMS uses to ramp down and stop machine 1 (derived from stop distance calculated in the machine PLC). X5 is the safety distance between the two machines along the x-axis. X6 is the distance SZMS uses to ramp up the speed for machine 1 (from 0 to full speed) along the x-axis. If both machines have come to a complete stop and machine 2 starts to move away from machine 1, SZMS ramps up the speed for machine 1 (follow function).

It is clear that the abovementioned objects 1,2,3 also may represent unmoveable structures such as the drill rig 17, so as to avoid collisions between the machines and the rest of the installation.

All operators operating machines in the system according to the invention will have visualisation means available, e.g. related to a humane machine interface (HMI). The HMI visualises if the machines have stopped (or are speed limited) due to actions taken by the system. Through this interface it is possible to manually neglect/disregard machines from the management system (SZMS). Thus machines may be removed from the system, e.g. if an error has occurred, so that an operation may continue.

Collision between machines and rig structure etc may be handled by the present invention as an additional feature. The system is not only handling machine specific anti collision scenarios related to machine position, but also scenarios related to handling of pipe etc (e.g. do not hoist if both elevator and roughneck clamp is locked on pipe). Exceptions from zone management control are also be handled by the present invention (e.g. one machine allowed to disregard another machines presence in an area due to situations that frequently occur, and are supposed to occur, in normal operation).

The dynamic boxes have chosen geometric shape and chosen dimensions representing each machine. The control system according to the present invention makes sure that there is a safety distance (but not much more) between the boxes (machines). A machine can follow another machine as long as the distance between them are greater than the safety distance.

The system and method according to the invention may be made using any available software and hardware tools, a person known in the art being able to choose the system most suitable to each situation, for example depending on other already available equipment on the site. Although the system as described is based on knowledge of the positions of the moveable objects the system may also incorporate sensors giving feedback to the system about the whereabouts and orientation of each object, so as to provide an extra security against collisions due to erroneous or unregistered shifts in the positions. Alternatively the system may of course be monitored visually in addition to showing the imaginary objects on a screen, so that an operator may obtain an additional control of the situation.

The invention claimed is:

1. System for controlling the movements of components in an automated or remote operated system comprising independent transporting means for moving a number of components relative to each other, the control system being providing with means for controlling the position and velocity of the components relative to each other, wherein
   each component is assigned a respective imaginary three-dimensional object having a defined geometric shape and having dimensions corresponding to or exceeding the physical dimensions of the respective component in all directions, the dimensions of each said assigned imaginary three-dimensional object being fixed irrespective of subsequent movement of the respective component,
   each transporting means is related to a stop distance needed for the respective transporting means to come to a complete stop, and
   a critical allowed distance is defined between said respective imaginary three-dimensional objects, said critical allowed distance being greater than zero, whereby collisions between components can be avoided by changing at least one of a speed or direction of movement of at least one of said transporting means when a distance between respective imaginary three-dimensional objects moving on a common axis corresponds to said critical allowed distance,
   wherein said critical allowed distance is defined based on the relative movement of the respective transporting means.

2. System according to claim 1, wherein the dimensions of the geometric shape corresponds to the size of the respective component.

3. System according to claim 1, wherein the critical allowed distance between two imaginary three-dimensional objects moving toward each other corresponds to the stop distance for each corresponding transporting means plus a predetermined additional distance.

4. System according to claim 1, wherein the components and corresponding imaginary three-dimensional objects are adapted to be rotatable.

5. System according to claim 1, wherein at least one said imaginary three-dimensional object is rectangular.

6. System according to claim 1 adapted for use on offshore installations, especially for handling pipes in drilling operations, wherein said components comprise means for storing, moving and/or installing equipment in offshore installations.

7. System according to claim 6, wherein the installation is a drill rig and the system is adapted for storing, moving and installing pipes on said drill rig.

8. Method for avoiding collisions between automatically controlled or remote operated components having variable positions and movements relative to each other said positions and movements being controlled by a control system, comprising:
   assigning an imaginary three-dimensional geometric shape to each component, said geometric shape having dimensions corresponding to or exceeding the dimensions of the corresponding component, the geometric shape thus occupying a space corresponding to or exceeding the space occupied by the component, and the dimensions of the assigned geometric shape being fixed irrespective of subsequent movement of the component,
   assigning a stop distance to each component, said stop distance being a distance needed for the respective component to come to a complete stop,
   defining a critical minimum distance between said geometrical shapes, said critical minimum distance being greater than zero, and
   when a distance between assigned geometric shapes moving on a common axis corresponds to said critical minimum distance, changing at least one of a speed or direction of movement of at least one of said corresponding components, whereby collisions between components can be avoided,
   wherein said critical minimum distance is defined based on the relative movement of the respective components.

9. Method according to claim 8, wherein the dimensions of the geometric shape correspond to the size of the respective component.

10. Method according to claim 8, wherein the critical minimum distance between two assigned geometric shapes moving toward each other corresponds to the stop distance for each corresponding component plus a predetermined additional distance.

11. Method according to claim 8, wherein the component and corresponding assigned geometric shapes are adapted to be rotatable.

12. Method according to claim 8, wherein at least one said assigned imaginary three-dimensional geometric shape is rectangular.

* * * * *